US005582726A

United States Patent [19]

Feller et al.

[11] Patent Number: 5,582,726

[45] Date of Patent: Dec. 10, 1996

[54] FILTER CENTRIFUGE

[75] Inventors: Johann Feller, Tuntenhausen; Bruno Hegnauer, Gauting; Wolfgang Knobloch, Tutzing, all of Germany

[73] Assignee: Krauss Maffei Aktiengesellschaft, Munich, Germany

[21] Appl. No.: 354,583

[22] Filed: Dec. 12, 1994

[30] Foreign Application Priority Data

Dec. 13, 1993 [DE] Germany .......................... 43 42 471.6

[51] Int. Cl.[6] .................................................. B01D 33/067

[52] U.S. Cl. .......................... 210/232; 210/370; 210/373; 210/380.3; 494/36; 494/38; 494/41; 494/83

[58] Field of Search .................................... 210/232, 370, 210/373, 380.3; 494/36, 38, 39, 41, 61, 83, 85

[56] References Cited

U.S. PATENT DOCUMENTS

| | | | |
|---|---|---|---|
| 3,365,066 | 1/1968 | Howell . | |
| 4,997,417 | 3/1991 | Martin | 494/39 |
| 5,169,525 | 12/1992 | Gerteis | 210/373 |
| 5,304,306 | 4/1994 | Gerteis | 210/373 |
| 5,421,997 | 6/1995 | Gerteis | 210/380.3 |

FOREIGN PATENT DOCUMENTS

| | | |
|---|---|---|
| 0379452 | 7/1990 | European Pat. Off. . |
| 3617769 | 10/1987 | Germany . |

OTHER PUBLICATIONS

PTO–95–6500–Translation of the German Article "Systematick i n der Konstruktion von Maschinen und Apparaten fur die chemische Industrie", Knott et al., pp. 217–222 1967.

Knott; "Systematik In Der Konstruktion Von Maschinen & Apparaten Fur Die Chemische Industrie"; Konstruktion 1967, vol. 6, 6 pages.

Heinkel; HF—Stulpfilterzentrifuge. Der Specialist fur Schwierige Einsatzfale; 4 pages.

Kraus Maffei Verfahrenstechnik GmbH; "Vertikalzentrifuge VZ"; 20B Auflage Mar. 1989, 4 pages.

*Primary Examiner*—David A. Reifsnyder
*Attorney, Agent, or Firm*—Herbert Dubno

[57] ABSTRACT

A filter centrifuge has the drum, the drum shaft and its bearings mounted in a movable machine support, carriage or bearing member which rides on a rail of the base machine support or frame so that with a cover for an opening in the rear wall on which the filter housing is mounted, the assembly of drum, shaft and bearing can be withdrawn into the machine space. When the movable wall is in place, a clean room containing the filter housing and the processing chamber, is closed off from the machine space.

20 Claims, 10 Drawing Sheets

FILTER CENTRIFUGE

FIELD OF THE INVENTION

Our present invention relates to a filter centrifuge having a rotatable filter drum which rotates about a horizontal axis in a housing, which may be referred to as a process housing, and wherein the drum is cantilevered by a shaft from the bearings which support the filter drum. A drive is provided for the machine, usually on the machine frame, and the machine frame is generally fixed.

BACKGROUND OF THE INVENTION

A filter centrifuge of the above type is described, for example, in "Knott, *Systematik in der Konstruktion von Maschien und Apparaten für die chemische Industrie*, Konstruktion 1967, Vol. 6, pages 217 to 222, FIG. 5".

This filter centrifuge has its process chamber closed at a cover at the axial end of the centrifuge. The access to the process chamber and thus to the centrifuge drum is through the opening which is closed by this cover. Maintenance work on the centrifuge drum is thus carried out within the process chamber. More substantial work may require removing the centrifuge drum to a work shop and for that purpose the centrifuge drum is generally pulled out of the machine through the process chamber of the centrifuge.

For the removal of the centrifuge drum special tools may be required and these tools may be available at the sides of the opening affording access to the process chamber. If work is required on the bearings or the seals of the centrifuge drum, the centrifuge drum also must be pulled out of the machine and frequently the bearings and seals must be withdrawn as well. All of these steps require work within the process chamber of the machine which can cause cross-contamination with the materials processed in the centrifuge, whether this is contamination by the personnel of the product or contamination of the personnel by the product, contact of personnel with product residues in the process chamber or contact of the bearings or components of the bearing system with such product residues. Further, the product itself can be contaminated by lubricants and other contaminants during the disassembly process as the bearings and shaft are withdrawn through the process chamber. The problem is most pronounced in filter centrifuges in the fine chemical and pharmaceutical industries.

There are filter centrifuges which are used in conjunction with clean rooms as described, for example, in EP 0 379 452. Even here substantially all of the work required on the centrifuge must be carried out in the clean room in which the process housing is located with the danger of contamination of the clean room. During this maintenance, production is interrupted.

There are also known filter centrifuges in which the main shaft together with the bearings and seals form a unit, i.e. a so-called cartridge, together with a self-supporting bearing housing. These bearing units can be mounted independently from the remainder of the filter centrifuge and, when maintenance is required on the seals or bearings, the cartridge can be completely removed and the work performed in a work shop without the danger of contaminating the process space. The removal of the cartridge can be effected either through the process chamber or rearwardly from the process chamber. In practice, however, when disassembly of the apparatus is required, e.g. for removal of the cartridge, some work must be performed in the process chamber of the centrifuge, risking a danger of contamination by or of personnel.

Furthermore, when work must be performed on the centrifuge drum, this must be done within the process chamber with all of the drawbacks previously described.

Filter centrifuges are also known in which the bearing unit can be removed together with the drum as a unit. The removal of this unit, however, also must take place through the process chamber or require work in the process chamber with the described drawbacks of cross contamination.

OBJECTS OF THE INVENTION

It is the principal object of the present invention, therefore, to provide an improved filter centrifuge which minimizes maintenance work within the process chamber for the filter drum or the bearings of the filter drum, thereby reducing the risk of cross contamination to a minimum.

It is another object of this invention to provide a filter centrifuge as to which maintenance is facilitated and which can be utilized in a clean room setting without the danger of contamination of the clean room when maintenance of the drum or of the bearings and seals is required.

Still another object of this invention is to provide an improved filter centrifuge which is free from drawbacks of earlier filter centrifuges.

SUMMARY OF THE INVENTION

These objects and others which will become apparent hereinafter are attained, in accordance with the present invention in a filter centrifuge which basically comprises:

- a fixed machine support;
- a movable machine support displaceable relative to the fixed machine support;
- a centrifuge housing mounted on the fixed machine support;
- a filter drum received in the housing and rotatable about a substantially horizontal axis to separate liquid from solids by filter centrifugation in the housing;
- a shaft rotatable about the axis and carrying the drum at one end of the shaft for rotating the drum;
- bearings rotatable supporting the shaft with the drum being cantilevered by the shaft from the bearings, the bearings being mounted on the movable machine support for removal of the drum from the housing upon displacement of the movable machine support with the bearings and shaft thereon for maintenance of the centrifuge; and
- a drive coupled with the shaft for rotating the shaft.

According to the invention, therefore, the machine frame is comprised of a base room or fixed machine support and a movable bearing frame, i.e. the movable support mentioned previously and which is shiftable relative to the base frame in a substantially horizontal direction. The process housing is provided on the base frame and the bearings of the filter drum are provided on the movable bearing frame.

With this configuration, useful for continuously operating the filter centrifuges as well as discontinuously operating filter centrifuges, the work which may have to be performed on the filter drum can be performed outside the filter housing since the filter drum can be withdrawn through the aforementioned opening by the horizontal movement of the bearing frame, the bearings and seals mounted thereon, the shaft held in the bearing frame and the filter drum cantilevered on this shaft.

It has been found to be advantageous to provide the bearing frame or movable machine support so that it is movable in translation in the axial direction of the filter drum. For that purpose, the base frame or fixed machine support can be provided with a shifting track while the bearing frame or movable support is a carriage shiftable along this track. Advantageously, the track is formed by rails on which support rollers of the bearing frame can ride.

Since the fixed wall, which can be a back wall of the process housing, has an opening whose clear width is sufficient to pass the diameter of the filter drum, the filter drum can be withdrawn through the opening without difficulty. The opening is normally closed in use by a movable wall which can be provided on the aforementioned carriage, i.e. the movable support, whose contours and dimensions are matched to the opening in the rear wall.

The movement of the bearing frame and the filter drum thereon, together with the bearings, thus also serves to open and close the process housing by removing the cover for the opening or replacing that cover.

Advantageously, between the outer periphery of the rear wall cover or movable wall and the periphery of the opening, at least one sealing element is provided.

The sealing element, according to the invention, can be provided in a ring in a first peripheral groove in, for example, the cover or movable wall. An especially advantageous self-centering can be achieved when the periphery of the opening widens conically in the direction of the movable support and the periphery of the movable wall or cover converges conically complementarily in the direction of the drum.

To secure the movable wall, a mechanical latch or locking device can be provided between the fixed rear wall and the movable wall or cover. This mechanical locking device can be a radially-movable locking element, e.g. a ring, receivable in a receiving element, for example, another annular groove.

The ring can be a split ring which can be forced into the latter groove by a device at the split for spreading or contracting the ring. This construction of the latch means has the advantage that a uniform lock all around the periphery of the opening can be ensured.

In an alternative construction, the movable wall or cover can have a flange overlying the fixed wall around the opening and bolts can connect the flange to the fixed wall.

Advantageously, the rear wall is rigidly connected with the base frame and the process housing is removably mounted on the fixed wall. In this manner, not only can the filter drum be removed as has been described, but the process housing can be removed and replaced, if necessary, e.g. for substitution of a scraper centrifuge housing for a pusher centrifuge housing or vice versa at low cost and with little down time.

It is also advantageous to provide a cover for the rear wall opening which is independent of the movable wall on the movable machine frame so that, upon withdrawal of the filter drum, the rear wall opening can be sealed to close off the process housing from the space behind it without requiring the insertion of another filter drum and return of the movable machine support.

The displacement of the bearing frame and the filter drum mounted thereon with its shaft can be simplified when the drive of the filter centrifuge includes a motor mounted on the base frame and connected with the shaft by an appropriate transmission element such as a belt. One or more V belts can be used for this purpose and it is merely necessary to disengage the V belts before the bearing frame is shifted. This allows a replacement of the bearing frame and the parts carried thereby without disassembly of the drive.

The invention has been found to be particularly suitable in conjunction with a clean room, where the back wall, i.e. the fixed wall mentioned previously, forms part of a partition between the clean room and a space accommodating the base frame and the bearing frame, the bearings and the motor of the drive. The filter centrifuge can thus be mounted precisely at the separation between the clean room and a machine room of a structure with all maintenance procedures being carried out in the machine room without a danger of contamination of the clean room.

BRIEF DESCRIPTION OF THE DRAWING

The above and other objects, features, and advantages will become more readily apparent from the following description, reference being made to the accompanying drawing in which.

Figures 7A, 7B, 7C:
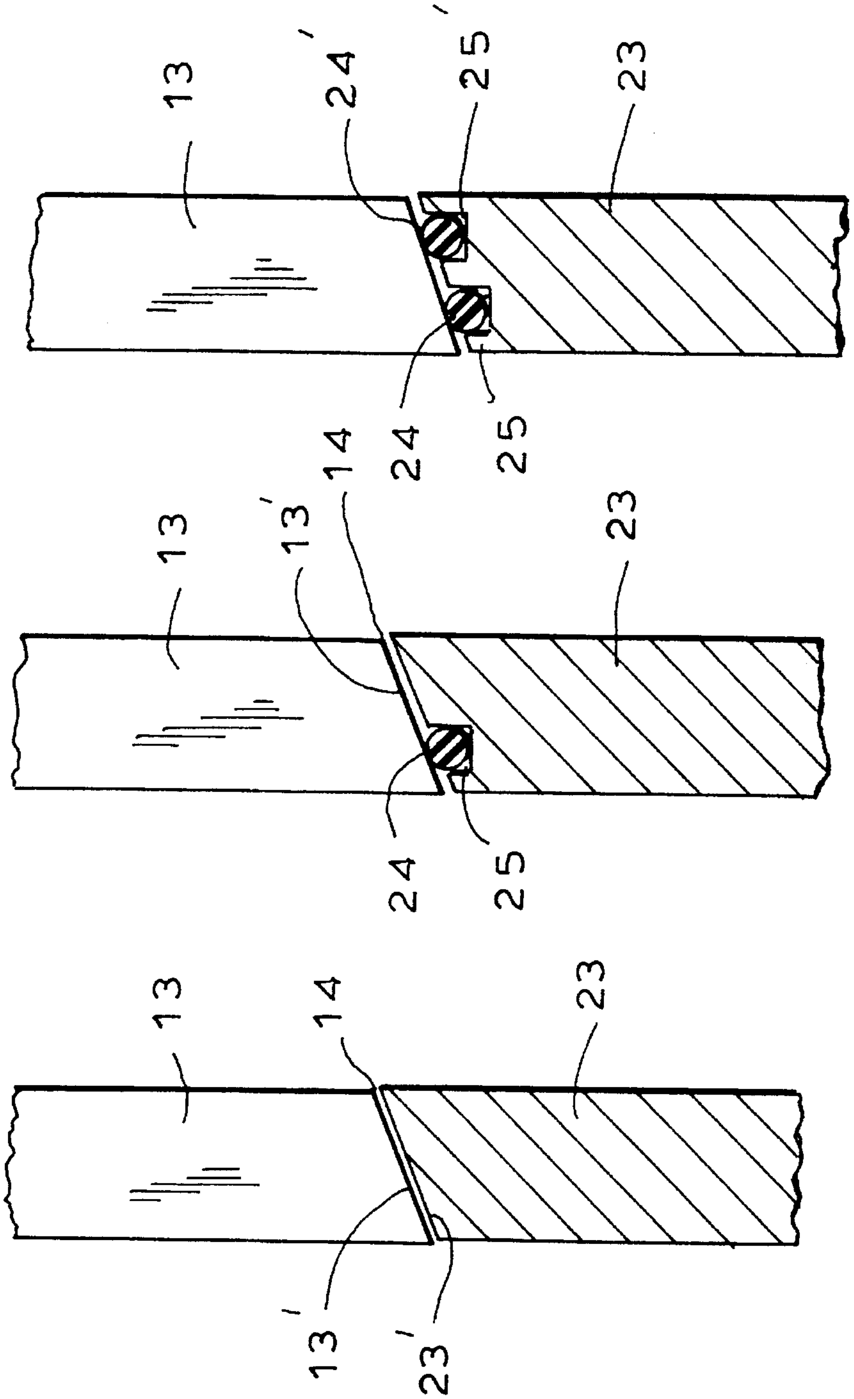
Figure 9:
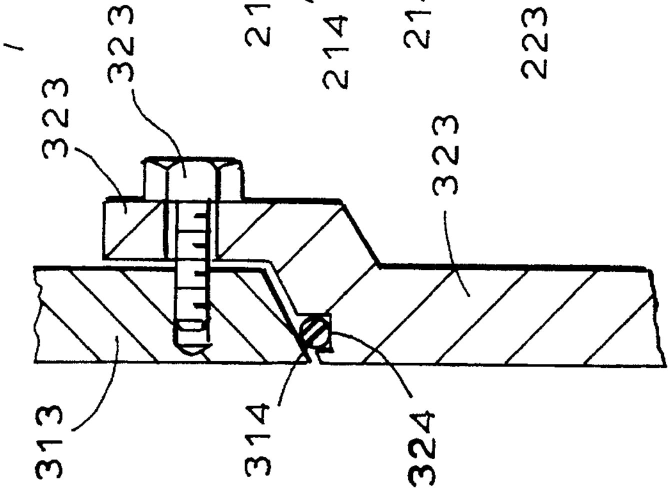

FIGS. *7a–7c* are cross sectional views showing different seal arrangements between the movable wall and the fixed wall;

FIGS. **8*a* and 8*b* are views similar to FIG. 7** showing latch arrangements in different positions;

FIG. **8*c*** is a view taken along the line VIII*c* of FIG. **8*b*** showing the spreading means of the latch;

FIG. 9 is a cross sectional view illustrating an alternative mode of connection of the movable wall to the fixed wall; and FIGS. **10*a*–10*c*** are cross sectional views showing alternative seal constructions between a cover for the opening and the fixed wall.

SPECIFIC DESCRIPTION

Figure 1:
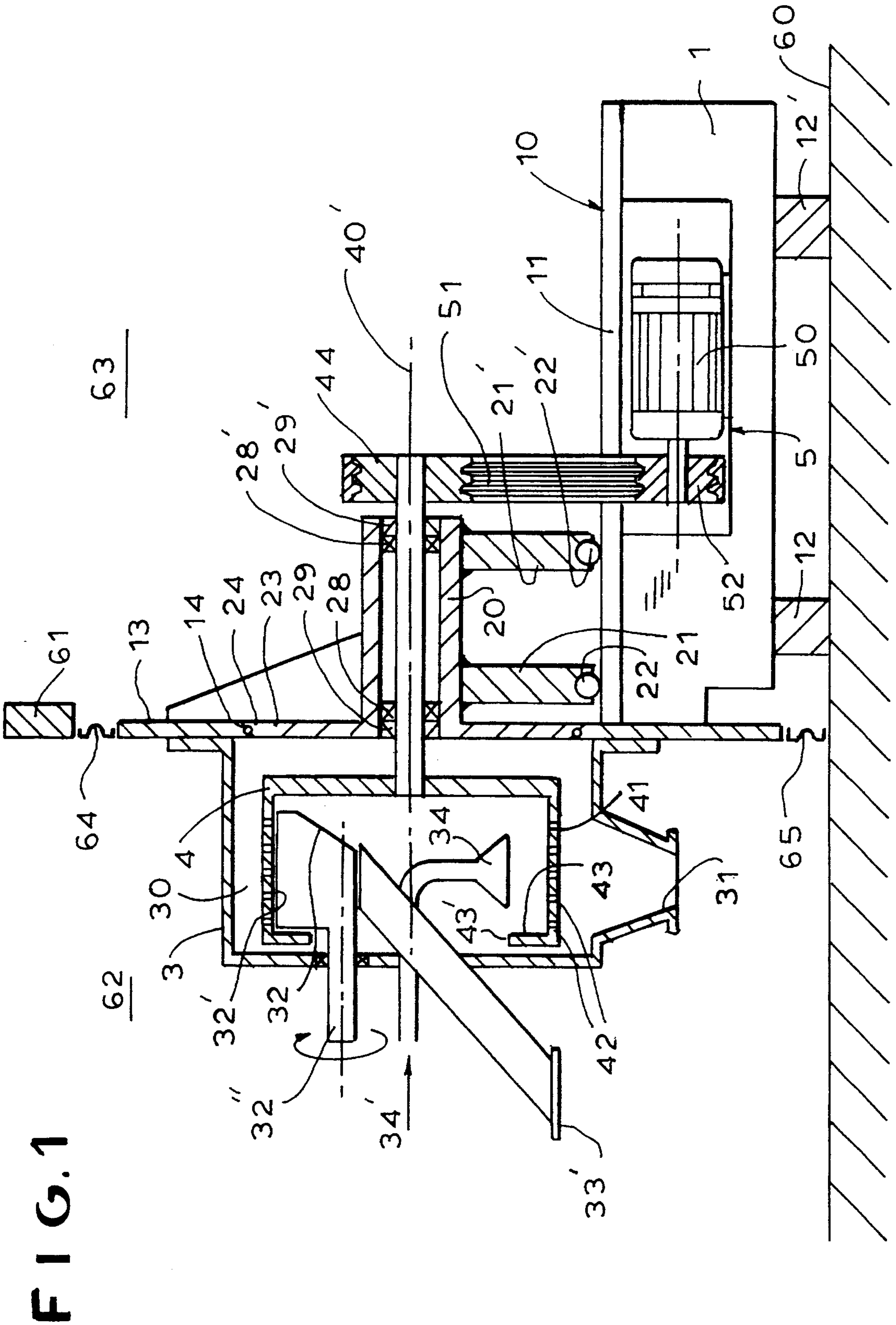
FIG. 1 is a vertical section through a scraper-type filter centrifuge according to the invention.

FIG. 1 shows a first embodiment of a filter centrifuge according to the invention in the form of a scraper type of centrifuge, i.e. a centrifuge in which the filter cake is removed by a scraper. A base frame 1 is mounted via vibration dampers 12, 12' on the floor 60 of a plant. At its upper side, the base frame 1, which forms the fixed machine support, is provided with a track 10 having at least one horizontally extending rail 11.

A bearing frame 2, constituting the movable machine support, comprises a horizontal mounting tube 20 which is attached to support feet, 21, 21' and rolls, like a carriage, via rollers 22, 22' on the rail 11. As a result, the bearing frame 2 is movable relative to the base frame 1, horizontally in translation. Within the support tube 20, a filter drum shaft 40 is journaled in bearings 28, 28' which can be ball or roller bearings, about a horizontal axis 40'.

The filter drum shaft 40 projects axially beyond the tube 20 at both ends. At the ends of the type 20, each of the bearings 28, 28' is protected by a respective shaft seal 29, 29'.

The base frame 1 is provided at its left-hand end with a vertically-extending wall forming the fixed wall member 13. The wall 13 partly closes the back of the filter housing, also referred to herein as the process housing 3.

The process housing 3 is removably mounted, e.g. by screws through flanges, on the back wall 13 and defines therewith a process chamber 30 which has at its bottom an outlet 31 for the filtrate.

Within the process housing 3, a filter drum is provided. The filter drum 4 is cantilevered on the free left-hand end of the filter drum shaft 40 and thus can be rotated within the process chamber 30 about the axis 40'. The filter drum 4 comprises a perforated shell 41 in which radial filter openings 42 can be formed. The end 43 of the filter drum 4 opposite the end provided with the shaft 40 is formed with a large central opening 43'.

The scraping blade 32 extends into the drum 40 through the central opening 43 and can be rotated on a shank 32" of the blade to swing its scraping or shoving edge 32' close to the inner surface of the drum at the top thereof. The edge 32' can lie against the inner periphery of the drum.

Consequently, by rotation of the scraper about its axis on the shank 32', the scraper edge 32' can shave the filter cake formed on the inner wall of the drum during centrifugal filtration. The removed filter cake falls into a chute 33 which also extends through the opening 43' in the filter drum and can be removed from the process housing 3. The chute terminates in the outlet opening 33'.

Furthermore, a filling pipe 34 can open within the filter drum 4 for delivering the suspension of solids in liquid into the latter, the suspension being fed into the drum as represented by the arrow 34'.

On the base frame 1, a drive 5 is provided and can include a drive machine, for example, an electric motor, connected by a first V-belt pulley 52 which transmits torque via one or more V belts 51 to a driven V belt pulley 44 affixed to the second free end of the shaft 40.

The back wall 13 is provided with an opening 14 which is dimensioned to clear the filter drum 4, i.e. has a lumen which is greater than the diameter of the filter drum 4. In this manner, when the bearing frame 2 is moved to the right, the filter drum 4 can be displaced through the opening 14, thereby removing the filter drum 4 from the process housing 3. This position has been shown in FIG. 3.

To close the opening 14 in the process housing 3 when the filter drum is inserted into the filter housing, a movable wall 23 is provided which also forms a rear wall cover. This movable wall has its dimensions and contours corresponding to those of the opening 14.

Figure 3:
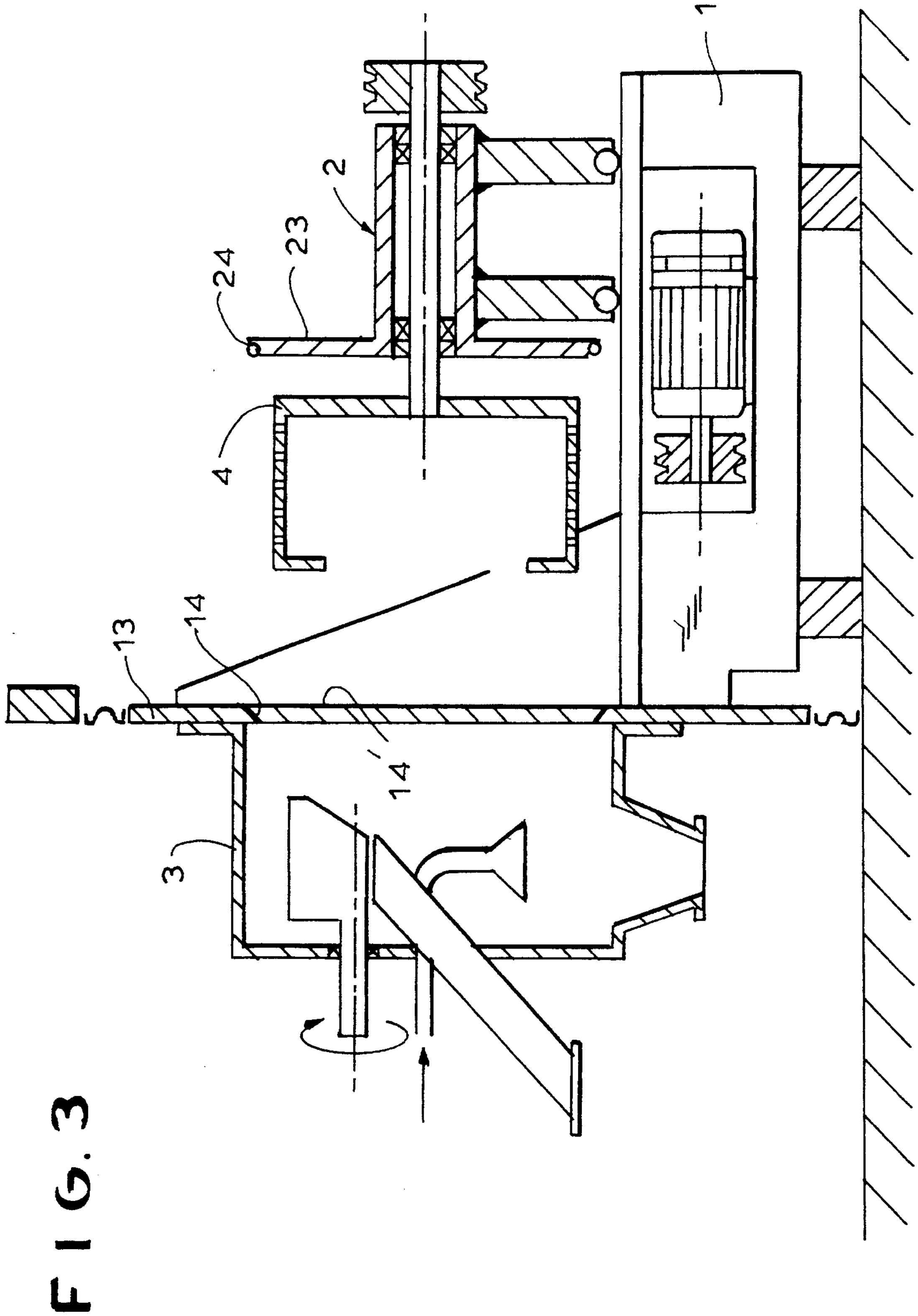
FIG. 3 is a view similar to FIG. 2 wherein, however, the separate cover has been inserted in the opening.

While the filter drum 4 is outside the housing 3, the opening 14 can be covered by a closure or cover 14' which is fitted into the opening as shown in FIG. 3.

The rear wall 13 is part of a partition 61 in the building separating a clean room 62 in which process housing 3 is located from a machine room 63 in which the base frame 1, the bearing frame 2 and the drive 3 are located. Sealing between the wall 13 and the remainder of the partition 61 or the floor 60 can be effected by elastic partition elements 64 and 65.

Figure 4:
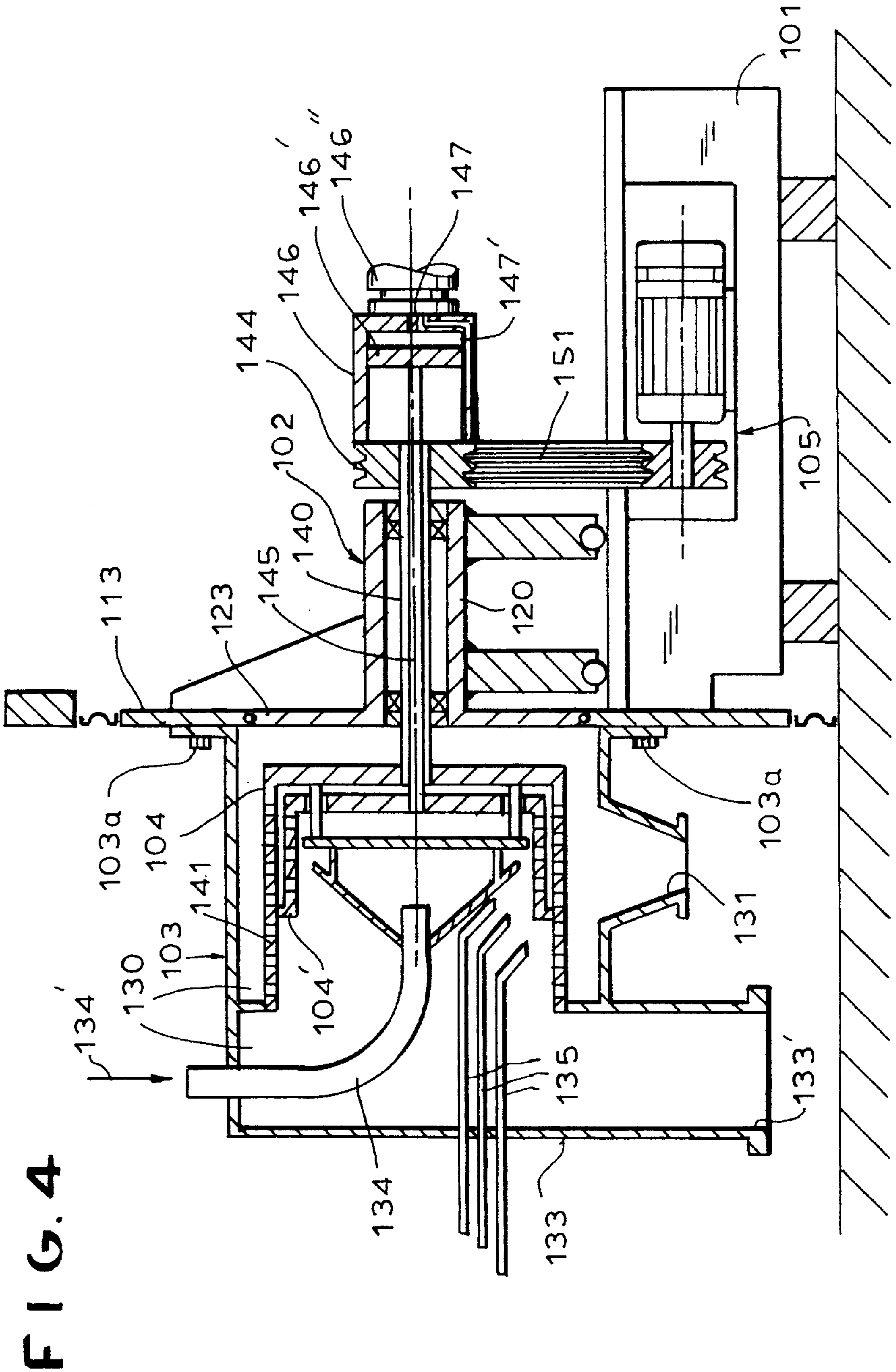
FIG. 4 is a vertical section through a pusher type filter centrifuge according to the invention.
Figure 5:
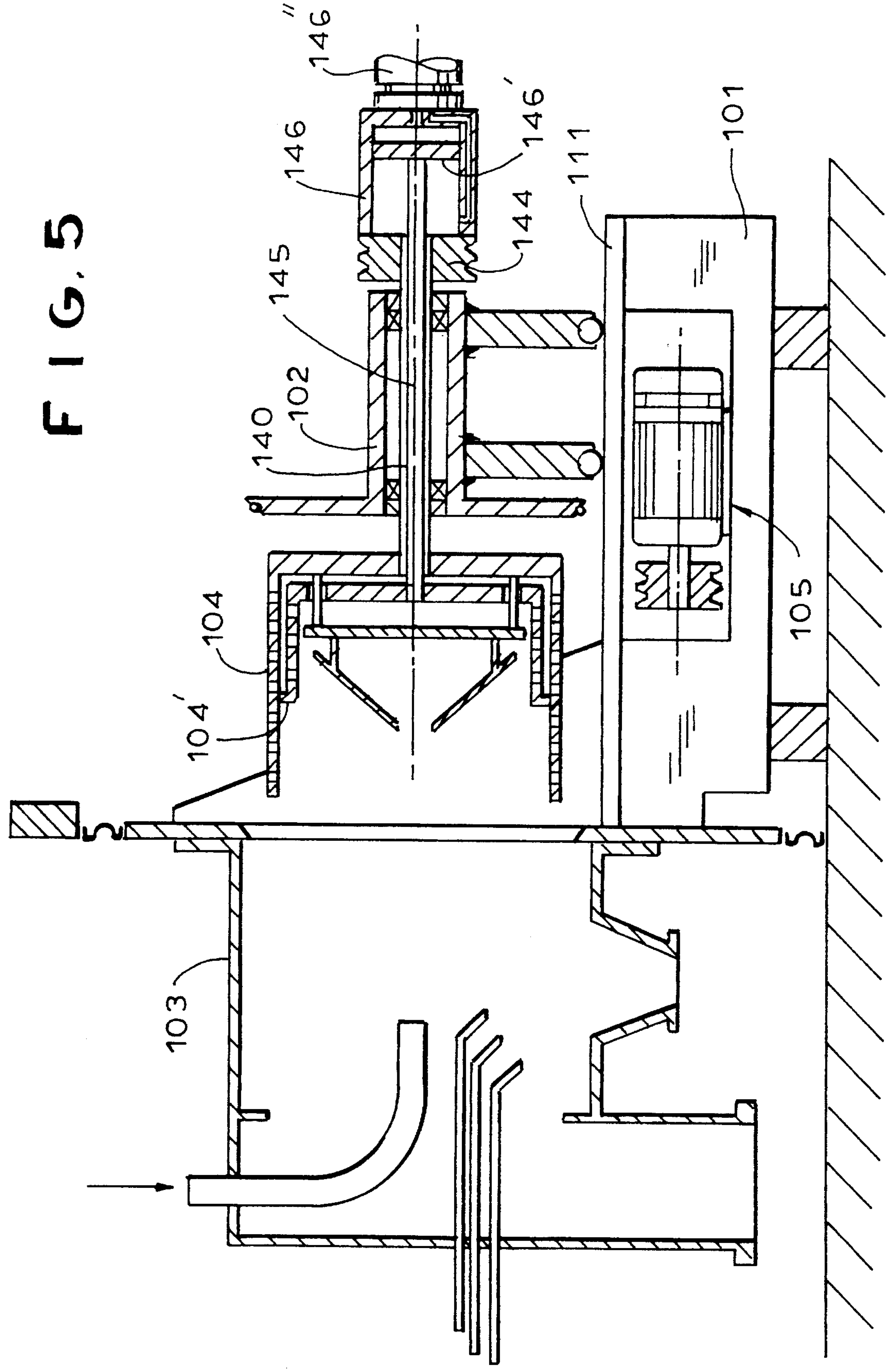
FIG. 5 is a view similar to FIG. 4 showing the filter drum removed from the housing.

FIGS. 4 and 5 show another embodiment of the invention in which the filter centrifuge is a pusher-type centrifuge. Similar reference numerals have been used in FIGS. 4 and 5 to those used in FIGS. 1–3, increased by 100.

The filter drum shaft 140 journaled in the support tube 120 of the bearing frame 102 is here formed with a hollow shaft and within this hollow shaft, an inner filter drum shaft 145 is axially shiftable. It is, however, rotatably coupled with the shaft 140. The filter drum shaft 140 is provided with a filter drum 104 which, in axial cross section, has a U configuration. Within the filter drum 104 a filter drum insert 104', also of U cross section, is provided. This insert 104 is connected with the inner filter drum shaft 105 and is shiftable therewith.

The end of the filter drum shaft 145 opposite that on which the insert 104' is provided can carry a piston 146' slidable in a cylinder 146. The piston-and-cylinder unit 146, 146' can thus axially shift the shaft 145 and the insert 104' to displace any filter cake on the drum 104 into the chute 133. The supply of the actuating fluid to the piston-and-cylinder unit 146, 146' is effected through a rotary fluid coupling 146'" and that fluid is delivered to passages 147 and 147' in the cylinder 146.

As noted, the axial shifting of shaft 145 toward the housing 103, shifts the insert 104' in FIG. 4 to the left to discharge the filter cake on the drum 104 to the left of that insert, the solids being recovered through the outlet 133'.

Rinsing or washing pipes 135 can open into the process chamber 130 to deliver rinsing or washing water to the interior of the filter drum 104 and the insert 104'. The construction and function of such a pusher-type centrifuge is known although the journaling of the drum utilizing a horizontally-displaceable bearing frame 102 is, however, new.

Figure 2:
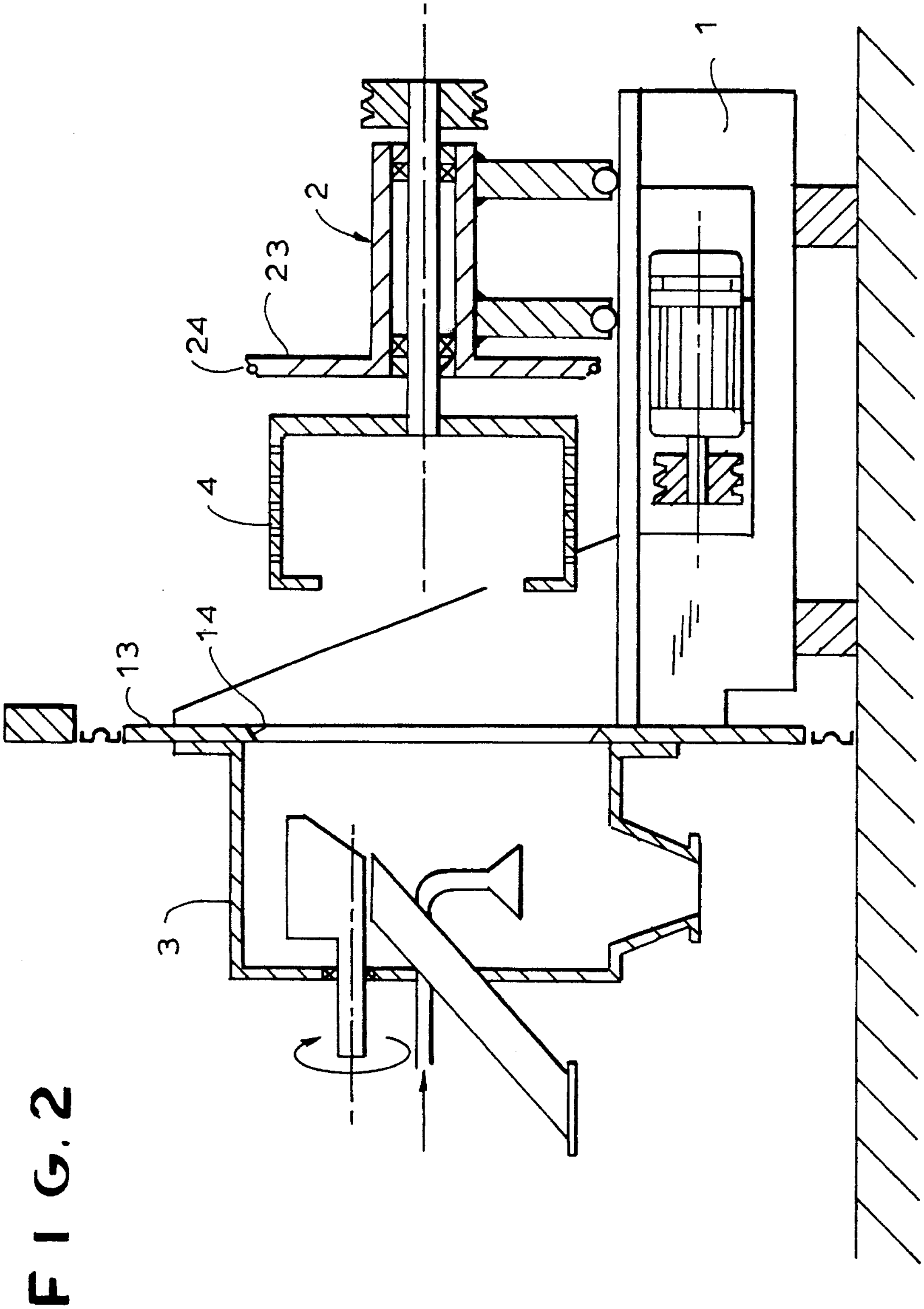
FIG. 2 is a view similar to FIG. 1 showing the filter centrifuge following withdrawal of the centrifuge drum.

The withdrawal of the filter drum from the housing in the embodiment of FIG. 4 is effected in the same way as in the embodiment of FIGS. 1 and 2. The drum 4 with its insert 104' together with the bearing frame 102, the filter drum shaft 140, the inner filter drum shaft 145 functioning as a plunger, the second V belt pulley 144 and the piston-and-cylinder unit 146, 146' together with the rotational coupling 146" for the pressure fluid in FIG. 5, can thus be moved to the right. The drive 105 remains in place and only the belt 151 need be removed. The length of the rail 111 is so dimensioned that the filter drum 104 can be completely withdrawn from the process housing 103.

Since the process housing 103 is removably affixed to the rear wall 113, e.g. via the bolts 103*a*, the filter centrifuge of the invention can be constructed in a modular manner allowing conversion from a scraper-type centrifuge into a pusher-type centrifuge for production changes in a rapid and problem-free manner.

Figure 6:
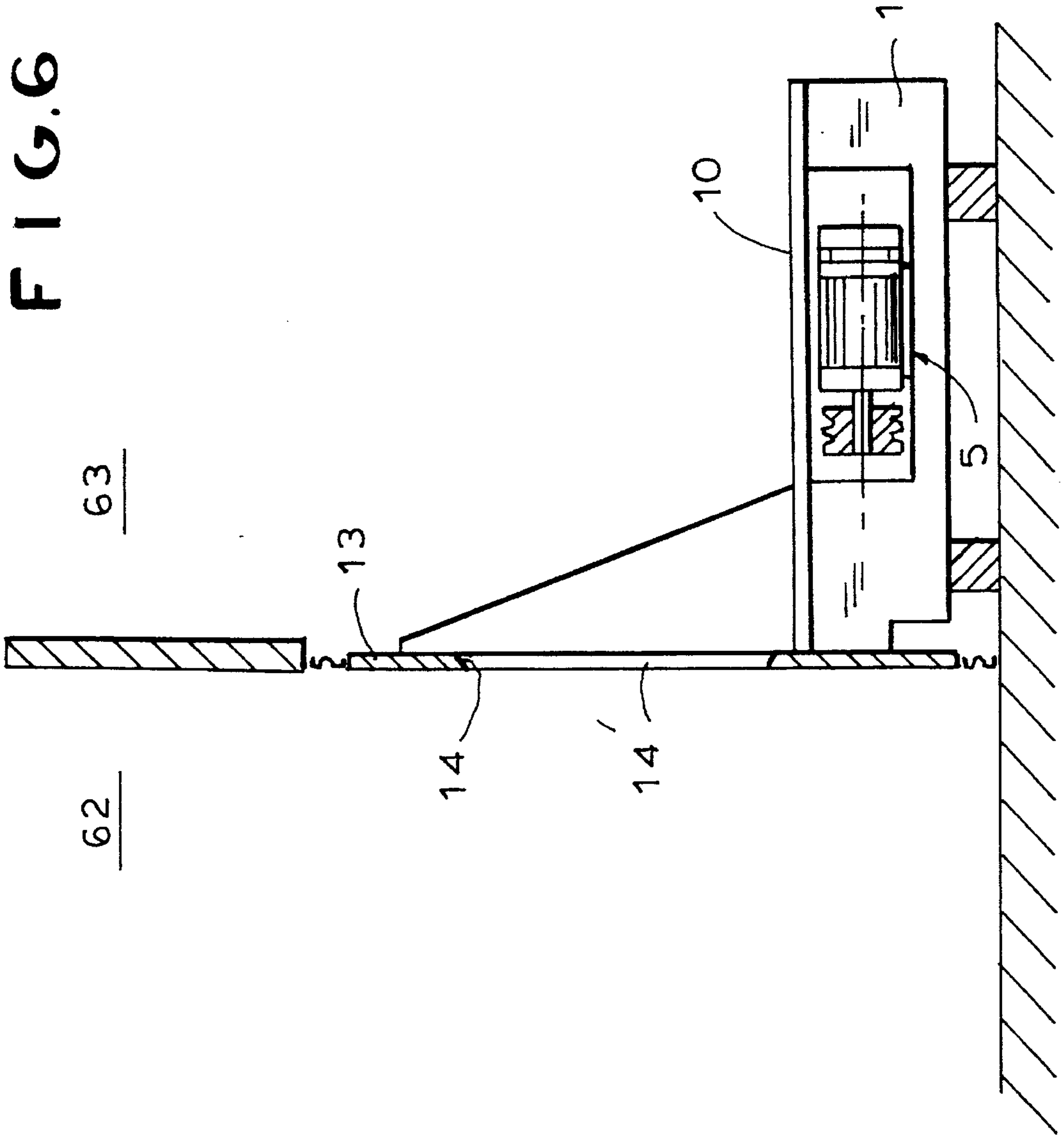
FIG. 6 is a diagram showing how the basic machine frame structure can be utilized with different process housings and filter drums and there are bearing frames in according with the invention.
Figures 1, 6B:
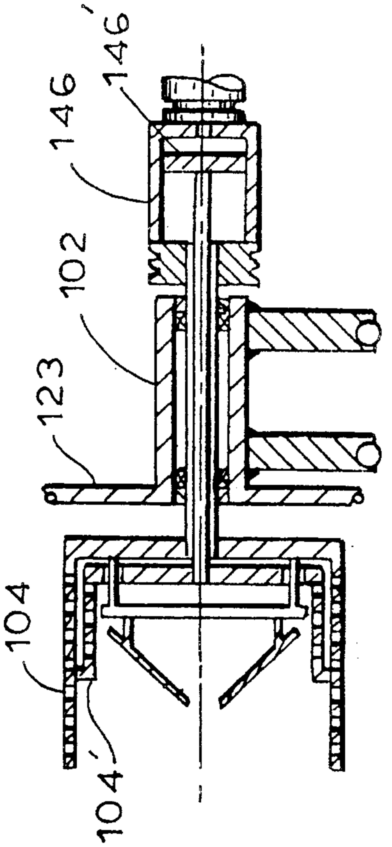
Figure 6B:
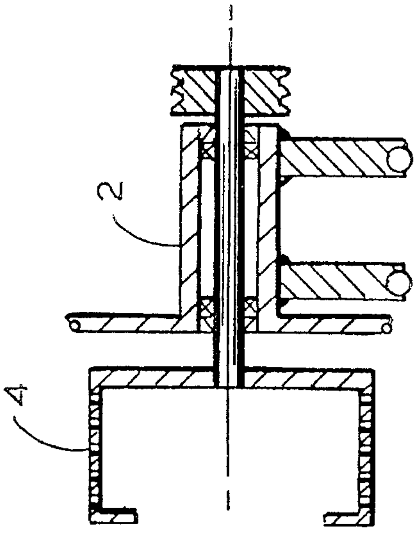
Figure 6A:
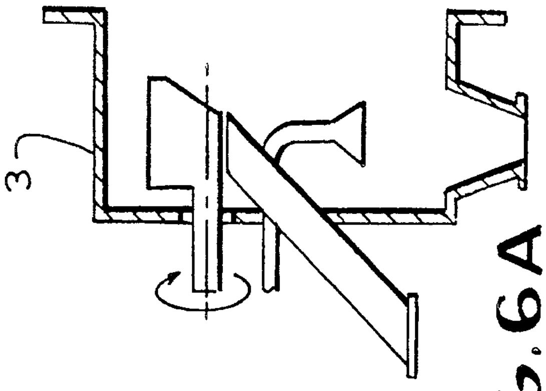
Figures 1, 6A:
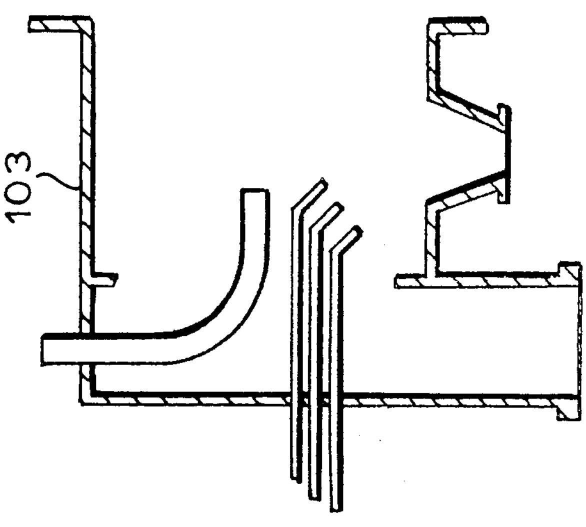

Such a conversion has been represented diagrammatically in FIG. 6. FIG. 6 shows the base frame 1 with its drive 5 and rear wall 13. The rear wall 13 is closed by means of the removable cover 14', hermetically closing off the clean room 62 from the machine room 63.

For transformation, the process housing 3 or 103 previously used, for example, the process housing 3, can be removed as symbolized by the arrow A and replaced by the housing 103 (arrow A').

Correspondingly, the carriage formed by the bearing frame 2 can be removed together with the drum 4 and the bearing, drum shaft and V belt pulley, etc., as represented by the arrow B for replacement by the drum 104, the carriage 102, the movable wall 123 and the piston-and-cylinder unit 146, 146' as represented by the arrow B'. When the additional cover 14' is removed and the opening 14 freed, the frame 102 can be shifted to the left and the wall 123 locked in place to conclude the conversion.

FIGS. *7a–7c* show different constructions of seals between the movable wall or cover 23 and the fixed wall 13.

FIG. *7a*, for example, shows a simple contact seal between the axially-diverging flank 13' of the wall 13 surrounding the opening 14 and the inwardly-converging frustoconical flank 23' of the periphery of the movable wall 23.

Figure 8C:
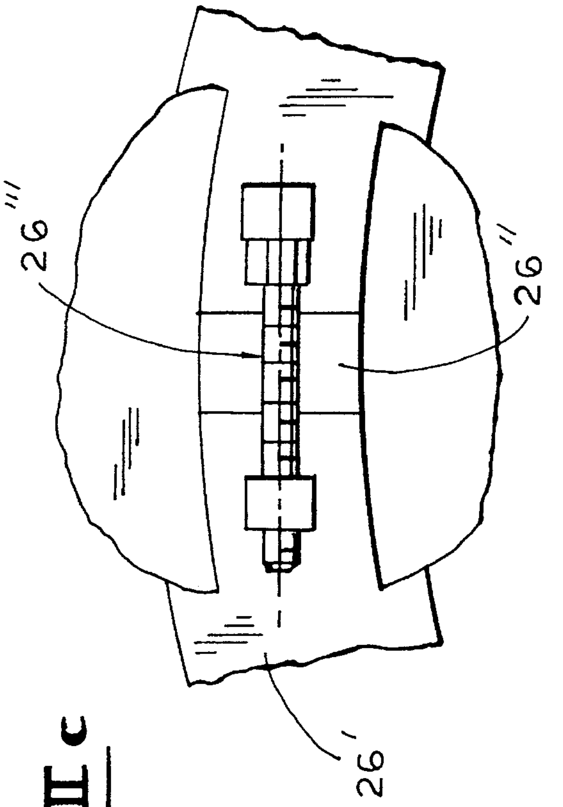

In FIG. *7b*, a circumferential groove 25 is provided in the periphery of the movable wall 23 and the seal is formed by an O-ring 24 which presses against the frustoconical surface 13' bounding the opening 14. The seal of FIG. *7b* is effective for most purposes. For greater hermetic sealing where required between the process space and the environment, the seal configuration of FIG. *7c* may be used. Here a pair of axially-spaced grooves 25, 25' are provided and each receives an O-ring 24, 24'. With greater pressure differences between the process chamber and the ambient, i.e. the machine room, a mechanical locking or latching between the cover 23 and the rear wall 13 is desirable. In that case a latching arrangement as shown in FIGS. 8*a* and 8*b* may be used (see also FIG. 8*c*).

Around the periphery of the cover 23 is a first circumferential groove 25 in which an O-ring 24 can be received to seal against the fixed wall 23 in the same manner as in the embodiment of FIG. *7b*.

Behind the groove 25, is a further peripheral groove 27, spaced from the groove 25 in the direction of the machine room 63, in which a split ring 26' is received. The split ring can have a radial seal 26". The split ring forms a latch element generally represented at 26".

Figure 8B:
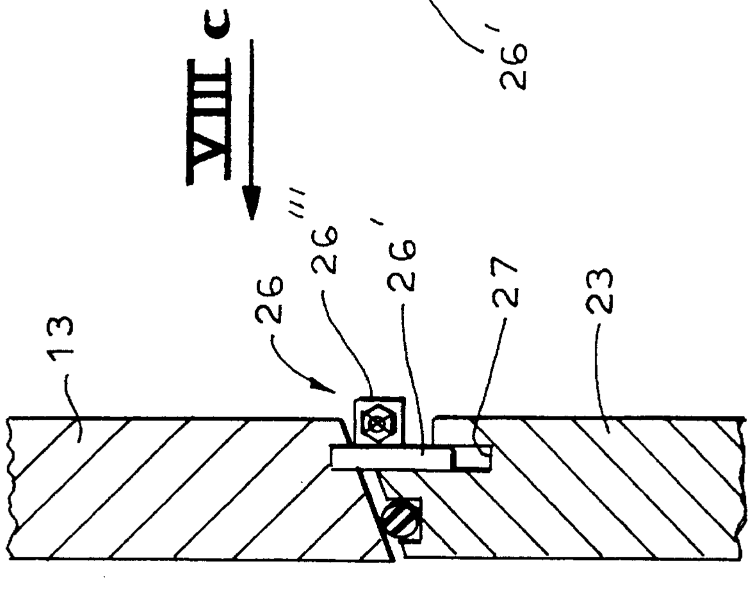
Figure 8A:
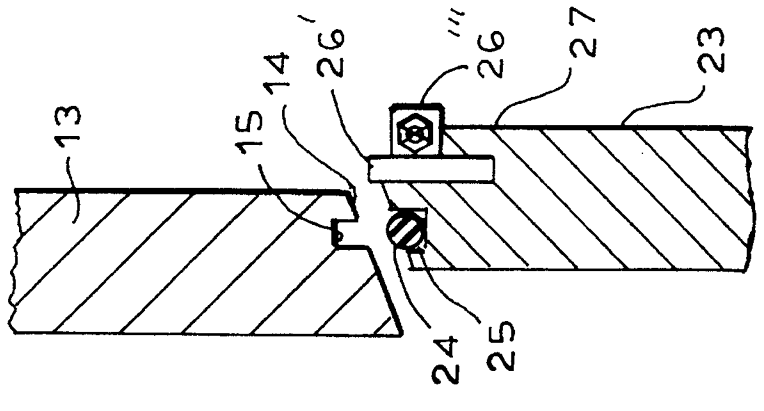

Bridging the ends of the split ring across the gap 26", is a tension screw 26''' which, when rotated, can allow the ring 26' to spread, thereby changing the diameter as the comparison of FIGS. 8*a* and 8*b* will show. On the inner periphery of the wall 13, i.e. around the opening 14, a circumferential groove 15 is provided in which the split rings 26' can engage (FIGS. 8*b* and 8*c*) when the ring spreads. The groove 15 is dimensioned so that the split ring 26' will not fully leave the groove 27 when it expands to lock the walls 13 and 23 together. The latching here is effective by rotating only a single screw. By rotating the screw in the opposite direction, the ring can be contracted (see FIG. 8*a*) to disengage from the wall 13.

FIG. 9 shows an alternative locking system in which the cover 323 is formed with the flange 323' overlapping the rear wall 313 and connected thereto by a threaded bolt 323'.

The seal can be effected by an O-ring 324 as in the prior embodiment.

Figure 10C:
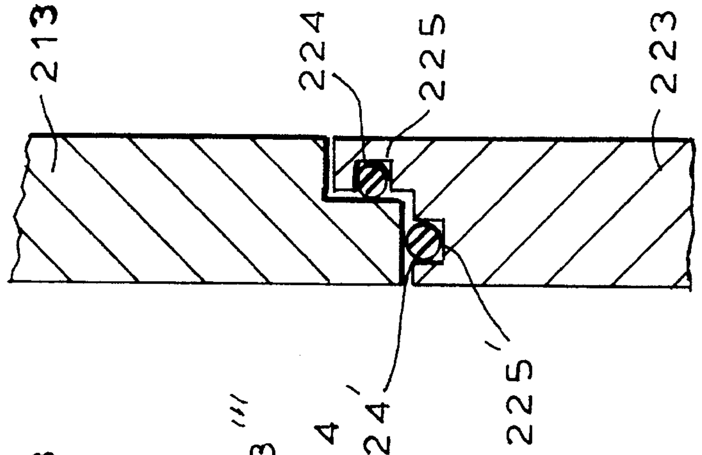
Figure 10B:
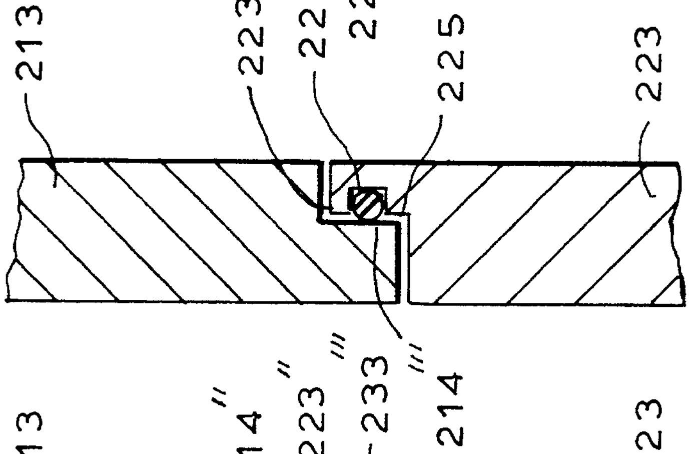
Figure 10A:
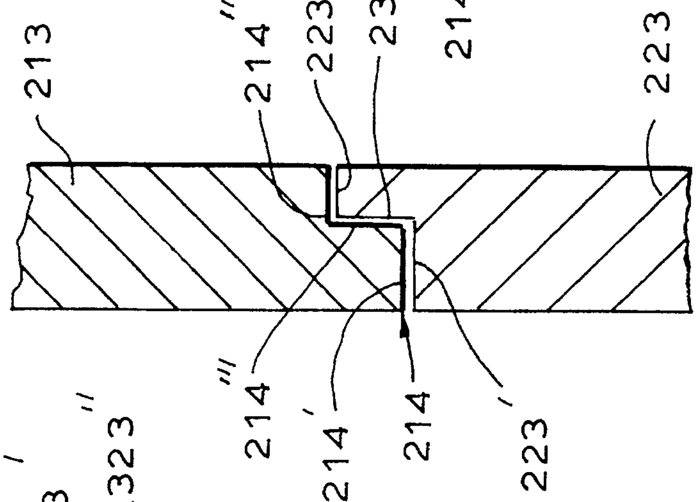

FIG. 10*a* shows another sealing arrangement between the rear wall or fixed wall portion 213 and the movable wall 223. In this case, a labyrinth-type seal is provided and the rear wall 213 in the region of the opening 214 is stepped to provide a section 214' of small diameter turned toward the process room side and a section 214' of larger diameter turned to the machine room side. Between these two places, a radial annular surface 214''' is formed.

The movable wall 223 is likewise stepped in the region of this periphery with a small diameter section 223' turned toward the process side and a large diameter step 223" turned toward the machine room. Between these steps, the radial surface 223''' is provided.

The surfaces 223''' and 214''' can abut one another to enhance the sealing effectiveness. In the embodiment of FIG. 10*b*, an axially open annular groove 225 is formed in the surface 223''' and receives an O-ring 224 abutting the surface 214'''.

FIG. 10*c* shows an embodiment in which the sealing is further enhanced by the provision of a groove 224' in the small diameter step of the movable wall 223 to accommodate another O-ring 225'.

By subdividing the machine frame of the filter centrifuge into a base frame 1 and the bearing frame 2, the construction of the filter centrifuge has been greatly simplified and fabrication costs have been reduced. Furthermore, maintenance costs because of he ease of withdrawal of the drum have been reduced as well. When the base frame can be used with different machine types as has been illustrated in FIG. 6, construction of the machine is simplified and changeover from one machine type to the other can be effected rapidly.

We claim:

1. A filter centrifuge, comprising:

a fixed machine support;

a movable machine support displaceable relative to said fixed machine support;

a centrifuge housing mounted on said fixed machine support;

a filter drum received in said housing and surrounding a axis, said drum being rotatable about said axis to separate liquid from solids of a suspension introduced into said drum by filter centrifugation in said housing;

a shaft affixed to said drum and rotatable about said axis said shaft supporting said drum at one end of said shaft and being drivable for rotating said drum about said axis;

bearings rotatably supporting said shaft, said drum being cantilevered by said shaft from said bearings, said bearings being mounted on said movable machine support for removal of said drum from said housing upon displacement of said movable machine support with said bearings and shaft thereon for maintenance of the centrifuge; and a drive coupled with said shaft for rotating said shaft.

2. The filter centrifuge defined in claim 1 wherein said movable machine support is displaceable in translation along said axis of the filter drum.

3. The filter centrifuge defined in claim 1 wherein said walls form a partition between a clean room provided with said housing and a space in a structure containing said bearings and said drive.

4. The filter centrifuge defined in claim 1 wherein said fixed machine support includes a fixed wall along an open side of said housing and formed with an opening of a size at least sufficient to clear said drum, said movable machine support including a movable wall shaped and dimensioned to fit in said opening and close said housing along a side thereof at which said walls are provided, said movable wall being removed from said opening upon movement of said movable machine support to withdraw said drum from said housing.

5. The filter centrifuge defined in claim 1 wherein a cover shaped to close said opening and independent of said movable wall is provided for closing off the interior of said housing.

6. The filter centrifuge defined in claim 1 wherein said drive includes a motor mounted on said fixed machine support and a transmission element coupling said motor with said shaft.

7. A filter centrifuge, comprising:

a fixed machine support;

a movable machine support displaceable relative to said fixed machine support;

a centrifuge housing mounted on said fixed machine support;

a filter drum received in said housing and surrounding a axis, said drum being rotatable about said axis to separate liquid from solids of a suspension introduced into said drum by filter centrifugation in said housing;

a shaft affixed to said drum and rotatable about said axis said shaft supporting said drum at one end of said shaft and being drivable for rotating said drum about said axis;

bearings rotatably supporting said shaft, said drum being cantilevered by said shaft from said bearings said bearings being mounted on said movable machine support for removal of said drum from said housing upon displacement of said movable machine support with said bearings and shaft thereon for maintenance of the centrifuge; and a drive coupled with said shaft for rotating said shaft, said movable machine support being displaceable in translation along said axis of the filter drum, said fixed machine support being provided with a track parallel to said axis and said movable machine support is a carriage shiftable along said track.

8. The filter centrifuge defined in claim 7 wherein said track is formed by rails and said carriage has rollers riding on said rails.

9. The filter centrifuge defined in claim 8 wherein said fixed machine support includes a fixed wall along an open side of said housing and formed with an opening of a size at least sufficient to clear said drum, said movable machine support including a movable wall shaped and dimensioned to fit in said opening and close said housing along a side thereof at which said walls are provided, said movable wall being removed from said opening upon movement of said movable machine support to withdraw said drum from said housing.

10. The filter centrifuge defined in claim 9, further comprising at least one sealing element between an outer periphery of said movable wall and a periphery of said opening.

11. The filter centrifuge defined in claim 10 wherein said sealing element is a ring received in a groove in said outer periphery of said movable wall.

12. The filter centrifuge defined in claim 11 wherein said periphery of said opening widens conically toward said movable machine support and said periphery of said movable wall converges concically complementarily to the periphery of said opening in a direction toward said drum.

13. The filter centrifuge defined in claim 12, further comprising a mechanical latch between said movable wall and said fixed wall.

14. The filter centrifuge defined in claim 13 wherein the mechanical latch comprises a radially-movable locking element on one of said walls and a receiving element on the other of said walls receiving said lock element.

15. The filter centrifuge defined in claim 14 wherein said radially-movable lock element is a split ring and the element receiving said ring is a groove, said ring being provided with means for controlled expansion thereof at a split in said ring.

16. The filter centrifuge defined in claim 13 wherein said mechanical latch includes a flange on one of said walls overlapping the other of said walls.

17. The filter centrifuge defined in claim 16 wherein said flange is connected to said other of said walls by bolts.

18. The filter centrifuge defined in claim 13 wherein said fixed wall is fixed to said fixed support and said housing is removably mounted on said fixed wall.

19. The filter centrifuge defined in claim 13 wherein a cover shaped to close said opening and independent of said movable wall is provided for closing off the interior of said housing.

20. The filter centrifuge defined in claim 13 wherein said drive includes a motor mounted on said fixed machine support and a transmission element coupling said motor with said shaft.

* * * * *